United States Patent [19]

Sutehall et al.

[11] Patent Number: 4,715,676
[45] Date of Patent: Dec. 29, 1987

[54] OPTICAL FIBER CABLE

[75] Inventors: Ralph Sutehall; Robert S. F. Clarke, both of Harlow, England

[73] Assignee: STC plc, London, England

[21] Appl. No.: 795,182

[22] Filed: Nov. 5, 1985

[30] Foreign Application Priority Data

Nov. 10, 1984 [GB] United Kingdom ................. 8428480

[51] Int. Cl.⁴ ............................................. G02B 6/44
[52] U.S. Cl. ............................... 350/96.23; 350/96.24
[58] Field of Search ........................... 350/96.23, 96.24

[56] References Cited

U.S. PATENT DOCUMENTS 4,534,618  8/1985  Brüggendieck .................. 350/96.23

Primary Examiner—Eugene R. LaRoche
Assistant Examiner—James C. Lee
Attorney, Agent, or Firm—Kerkam, Stowell, Kondracki & Clarke

[57] ABSTRACT

A design of optical fiber cable that is gas blocking has a set of four plastics packaged optical fibers (2) around a central strength member (1). The fibers and strength members are embedded in spaced apart relationship in a nylon 12 pressure extruded sheath (3) which has been annealed to provide a contraction in the region of ¼%.

6 Claims, 3 Drawing Figures

OPTICAL FIBER CABLE

BACKGROUND OF THE INVENTION

This invention relates to optical fiber cable, and in particular to constructions of such cables that are gas blocking.

In view of their potential for use in a submarine environment cable constructions have been proposed that are held out to be water blocking so that should such a cable be cut when submerged the penetration of water shall be limited. One example of a patent specification directed to water-blocked optical fiber cable is given by United Kingdom Patent Specification No. 2099179A. Although there are some similarities between the factors necessary to achieve satisfactory gas blocking, there are also major differences which are attributable in part to the much lower viscosity of gases, to the smaller values of hydrostatic pressure typically to be resisted, and to the fact that in achieving a gas-blocking design due attention must be paid to the prevention of ballooning of the cable sheath. It is in consideration of this last mentioned factor that the present invention is particularly concerned with cable constructions employing relatively high tensile modulus sheath materials.

SUMMARY OF THE INVENTION

Accordingly it is a general object of the present invention to provide a construction of optical fiber cable that is gas blocking. In pursuance of this there is provided a gas blocked optical fiber cable having an extruded sheath in which is embedded a central strength member that is longitudinally impermeable to gas. Also embedded in the extruded sheath, around the strength member, is a set of plastics packaged glass optical fibers spaced apart from each other and from the strength member. Each member of the set consists of a glass optical fiber possessing an optical waveguiding structure within the glass, and is provided with primary and secondary plastics coatings respectively of lower tensile modulus material that is not degraded at the extrusion temperature of the sheath material, and of higher modulus material that has a Vicat softening temperature higher than the extrusion temperature of the sheath material. The sheath is a pressure extruded sheath annealed to produce shrinkage, and is made of material having a tensile modulus of at least 700 MPa.

BRIEF DESCRIPTION OF THE DRAWINGS

There follows a description of the manufacture of a gas blocked optical fiber cable embodying the invention in a preferred form. This description refers to the accompanying drawings in which.

DETAILED DESCRIPTION OF THE PREFERRED EMBODIMENT

The cable now to be described has been designed to meet a specification requiring a 3 meter length of the cable to be able to withstand a pressure of at least 850 KPa applied to one end for a period of at least 25 hours without producing any noticeable leakage. The test for revealing the presence of leakage consisted of immersing the other end of the cable in a beaker of water and looking for the formation of any bubbles.

A high tensile modulus material is required for the cable sheath, and this material must be capable of being annealed to produce the necessary contraction. Nylon 12 is a suitable material for this purpose having regard to the fact that it can be annealed to produce contractions in the region of $\frac{1}{4}$% and that it can be extruded at a temperature of about 215° C. which is low enough not to degrade a conventional silicone resin fiber package primary coating and is beneath the Vicat softening temperature of ECTFE (ethylenechlorotetrafluoroethylene) which can satisfactorily be used as the secondary coating material.

Figure 1:
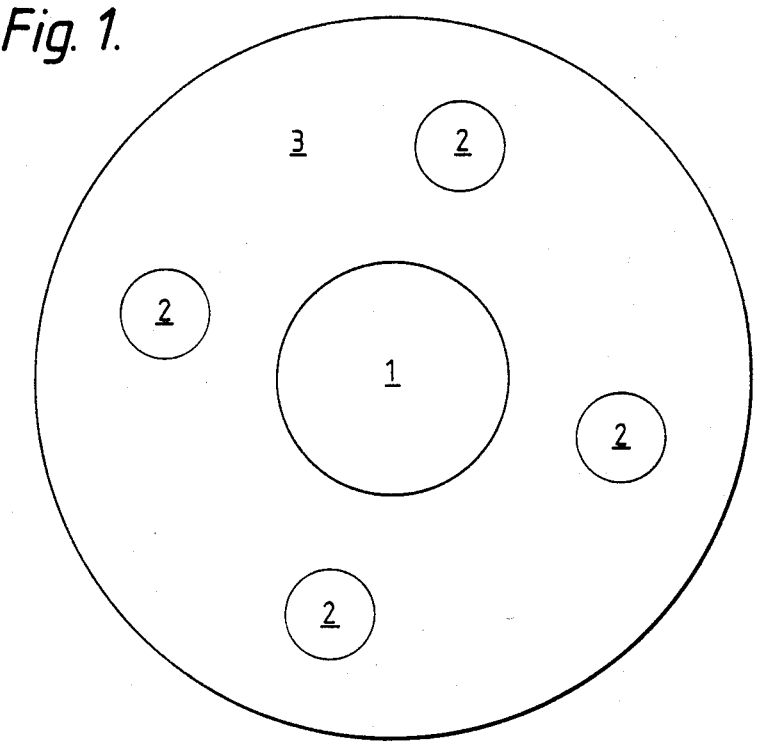
FIG. 1 depicts a schematic cross-section of the cable.

Referring now to FIG. 1, the central strength member 1 for this cable was an epoxy saturated helically wound glass fiber bundle supplied by Sportex of Neu-Ulm Germany as a cable strength member. This strength member was 2.1 mm in diameter, and around it were arranged four plastics packaged optical fibers 2 that were 0.85 mm in diameter. These packaged fibers 2 were evenly distributed around the strength member 1, and were positioned to be buried approximately midway through the thickness of the cable sheath 3 which had an overall diameter of 6.8 mm.

At the core of each packaged fiber 2 was a silica optical fiber 125 microns in diameter possessing an internal waveguiding structure. These fibers were each provided with a thin silicone resin primary plastics coating in the conventional way on-line with the fibers being drawn from preform, one of the functions of such primary coatings being to protect the pristine surface of the freshly drawn fiber from degradation by atmospheric attack, and another being to provide a measure of mechanical buffering for the fiber affording some protection from microbending. The primary coated fibers had a diameter of 220 microns, and this was brought up to 0.85 mm by the provision of a higher modulus secondary coating of ECTFE extruded around the primary coated fiber.

Figure 3:
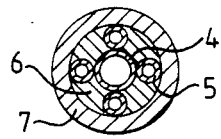
FIGS. 2 and 3 depict respectively side view and transverse section of the extruder point employed in extruding the cable sheath.
Figure 2:
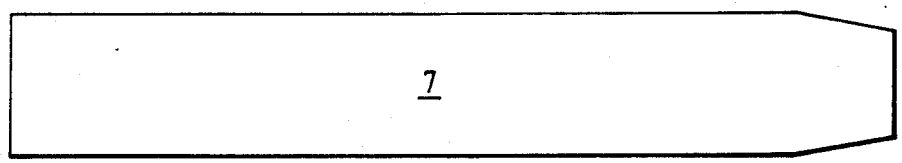

Referring now to FIGS. 2 and 3, a special point was constructed for the cross-head extruder used for extruding the cable sheath. This point was designed to keep all four packaged fibers and the strength member separated from each other as they entered the extruder so that each of the fiber filaments should be individually completely encircled by the melt. For this purpose the extruder point comprised a central length 4 of 2.5 mm bore hypodermic tubing surrounded by four lengths 5 of 0.9 mm bore hypodermic tubing, with these five lengths being soldered with silver solder 6 in position within a tube 7. The bores of the lengths of tubing 4 and 5 were dimensioned to accept passage of the strength member 1 and the packaged fibers 2 respectively. The in-board end of the tube 6 was given a slight chamfer to assist the flow of the extruder melt around the emerging filaments.

Previous work on the pressure extrusion of Nylon 12 used for the provision of secondary plastics coatings on optical fibers has revealed that contractions in the region of $\frac{1}{4}$% can be obtained with an appropriate annealing schedule for the product emerging from the extruder. (Some aspects of this work are reported by S. R. Barnes et al. in a paper entitled 'Processing and Characterisation of Tight Nylon Secondary Coatings for Optical Fibres' given at the PRI 'Plastics in Telecommunications III' Conference, Sept. 15th–17th, 1982, Conference Publication pages 15-1 to 15-12.) Based on this work, the cable sheath 3 was pressure extruded using a die with a bore the same diameter as the required finished size of the cable, a melt temperature of 213° C. and melt pressure of 2.9 MPa. The strength member and packaged fibers were preheated to 120° C., and, with a line speed of 4.5 meters per minute, the annealing schedule comprised passing the emerging cable first into a 0.6 meter long water trough maintained at 80° C., and then allowing it to cool in ambient air for a further 6.4 meters before take-up.

Tests upon the resulting cable revealed no noticeable leakage at a pressure of 1.3 Mpa. In this particular construction adequate flexibility to meet the particular design specification results without recourse to any helical lay of the fibers around the strength members. Hence a straight lay configuration was adopted. It will however, be evident that the apparatus can be modified in a straight-forward manner to enable the production of gas-blocked cables whose packaged fibers are helically stranded around the central strength member.

We claim:

1. A gas blocked optical fiber cable having an extruded sheath in which is embedded a central strength member that is longitudinally impermeable to gas, and also embedded in the extruded sheath, around the strength member, a set of plastics packaged glass optical fibers spaced apart from each other and from the strength member;

wherein each member of the set of packaged fibers consists of a glass optical fiber posessing an optical waveguiding structure within the glass, which glass is provided with primary and secondary plastics coatings respectively of lower tensile modulus material that is not degraded at the extrusion temperature of the sheath material, and of higher modulus material that has a Vicat softening temperature higher than the extrusion temperature of the sheath material;

and wherein the extruded sheath is a pressure extruded sheath annealed to produce shrinkage, and is made of material having a tensile modulus of at least 700 MPa.

2. A gas blocked cable as claimed in claim 1, wherein the cable sheath is made of nylon 12.

3. A gas blocked cable as claimed in claim 2, wherein the cable sheath is a pressure extruded sheath annealed under conditions providing a contraction of $\frac{1}{4}$% or greater.

4. A gas blocked cable as claimed in claim 1, wherein the secondary coating of the fibers is made of ECTFE.

5. A gas blocked cable as claimed in claim 4, wherein the cable sheath is made of nylon 12.

6. A gas blocked cable as claimed in claim 5, wherein the cable sheath is a pressure extruded sheath annealed under conditions providing a contraction of $\frac{1}{4}$% or greater.

* * * * *